United States Patent
Nygren et al.

(10) Patent No.: US 7,802,166 B2
(45) Date of Patent: Sep. 21, 2010

(54) MEMORY CONTROLLER, MEMORY CIRCUIT AND MEMORY SYSTEM WITH A MEMORY CONTROLLER AND A MEMORY CIRCUIT

(75) Inventors: Aaron John Nygren, Munich (DE); Thomas Hein, Munich (DE); Martin Maier, Diessen (DE); Otto Schumacher, Dachau (DE)

(73) Assignee: Qimonda AG, Munich (DE)

( * ) Notice: Subject to any disclaimer, the term of this patent is extended or adjusted under 35 U.S.C. 154(b) by 1027 days.

(21) Appl. No.: 11/535,961

(22) Filed: Sep. 27, 2006

(65) Prior Publication Data

US 2008/0126843 A1    May 29, 2008

(51) Int. Cl.
*H03M 13/00* (2006.01)
(52) U.S. Cl. .............................. 714/758; 714/6; 714/700
(58) Field of Classification Search .................... 714/6, 714/700, 758
See application file for complete search history.

(56) References Cited

U.S. PATENT DOCUMENTS

| 3,708,783 | A  | * | 1/1973  | Hedin ......................... 714/746 |
| 6,704,890 | B1 | * | 3/2004  | Carotti et al. ................ 714/700 |
| 7,496,462 | B2 | * | 2/2009  | Murokita et al. .............. 702/90 |
| 2005/0034049 | A1 | * | 2/2005 | Nemawarkar et al. ....... 714/758 |
| 2005/0229075 | A1 |  | 10/2005 | Berkmann et al. |

* cited by examiner

*Primary Examiner*—Guy J Lamarre
(74) *Attorney, Agent, or Firm*—Patterson & Sheridan, L.L.P.

(57) ABSTRACT

Methods and apparatus for adjusting a phase difference between clock signals. A first clock signal at a memory controller is adjusted relative to a clock second signal at a memory device. In one embodiment, data is transferred to the memory device according to the first clock signal, which has a predetermined phase relationship with second clock signal. Data received at the memory device is sampled at the memory device according to the second clock signal. Analysis is done of the data on the memory controller and of the received data on the memory circuit. On the basis of the analysis, an adjustment may be made to the phase relationship.

17 Claims, 4 Drawing Sheets

| time position<br>Data vs. FCK@DRAM | comparison result<br>MC CRC vs. DRAM CRC | Action |
|---|---|---|
| Late | Pass | Move Data earlier |
| Centered | Fail/Pass | Do Nothing |
| Early | Fail | Move Data later |

MEMORY CONTROLLER, MEMORY CIRCUIT AND MEMORY SYSTEM WITH A MEMORY CONTROLLER AND A MEMORY CIRCUIT

BACKGROUND OF THE INVENTION

1. Field of the Invention

The present invention relates to a memory controller, a memory system and a method of adjusting a time position of a data transfer from a memory controller to a memory circuit.

2. Description of the Related Art

In memory systems data are delivered from a memory controller to a memory circuit. For attaining a high frequency for transmitting data to the memory circuit, it is necessary to align the phase of the transmitted data to an internal receiving clock of the memory circuit precisely. If the internal clock of the memory circuit and the data do not have a certain phase relationship at a sampling point of the memory circuit, an error-free data transfer cannot be guaranteed. Reduced timing budgets to higher data rates make these requirements to the phase alignment even harder.

An automatic adjustment mechanism may reduce in conventional methods the static mismatches between the propagations paths of the internal clock of the memory circuit and each data signal individually. Even voltage and temperature dependent drifts may be compensated to a certain level by continuous or periodic readjustment. For such an automatic mechanism to work, knowledge about the actual phase relationship of the internal clock and the data in the DRAM is needed. Current DRAM standards do not provide any mechanism for returning this information to the memory controller.

Conventional memory controllers solve this issue by making a set of functional tests with respect to the memory circuit. After writing specific data pattern with differently skewed phases into the memory circuit storage array and reading back, the data phase window with error-free transition is identified and an optimum write phase is chosen. For a certain level of drift tracking capability, this phase training must be redone periodically.

SUMMARY OF THE INVENTION

One aspect of the invention is to consider only a part of data for an error calculation and to use the result of the error calculation to adjust the time position of a data transfer from a first to a second electronic device.

A first embodiment of the invention refers to a memory controller comprising a data interface for sending data to a memory circuit and for receiving data from the memory circuit, a data providing circuit that is connected with the data interface and with a masking circuit. The providing circuit delivers the same data to the data interface and to the masking circuit; the data interface outputs the data with a predetermined time position relative to a time basis. The masking circuit is connected with an error detection circuit that is connected with an analyzing comparing circuit. The masking circuit masks parts of the data and delivers at least a non masked part of the data to the error detection circuit, which then calculates a first error result with the received non masked data and delivers the first error result to the analyzing circuit. The analyzing circuit is connected with the interface and receives a second error result of the memory circuit from the interface. The analyzing circuit then analyzes the first and second error result and delivers correlation information about the first and the second error result to a controlling circuit. The controlling circuit controls the time position of the output of the data by the data interface relative to the time basis depending on the correlation information.

A further embodiment of the invention refers to a memory circuit with memory elements for storing data comprising a data interface for sending data and for receiving data from a memory controller, the data interface is connected with a masking circuit; the interface receives the data, buffers the data, samples the buffered data according to a time basis and delivers the sampled data to the masking circuit; the masking circuit masks a part of the data and delivers at least a part of the non masked data to a further error detection circuit; the error detection circuit is connected with the data interface and delivers a second error result to the data interface; the data interface delivers the second error result to the memory controller.

Another embodiment of the invention refers to a memory system comprising a memory controller and a memory circuit with memory elements, wherein the memory controller comprising a data interface for sending data to a memory circuit and for receiving data from the memory circuit. A data providing circuit is connected with the data interface and with a masking circuit and outputs same data to the data interface and to the masking circuit with a predetermined time position to a time basis. The masking circuit is connected with an error detection circuit which is connected with an analyzing circuit. The masking circuit masks parts of the data and delivers at least a part of the non masked data to the error detection circuit; the error detection circuit calculates with the received at least non masked data a first error result and delivers the first error result to the analyzing circuit which is connected with the interface and receives a second error result from the interface. The analyzing circuit analyzes the first and second error result and delivers correlation information about the first and the second error result to a controlling circuit. On the basis of the correlation information, the controlling circuit controls the time position of the data that are sent by the first interface in reference to the time basis. A further data interface of the memory circuit is configured for sending data and for receiving data, and is connected with a further masking circuit. The further interface receives the data, buffers the data, samples the buffered data according to a time basis and delivers the sampled data to the further masking circuit. The further masking circuit masks a part of the data and delivers at least a part of the non masked data to a further error detection circuit; where the error detection circuit is connected with the further interface and delivers a second error result to the further data interface. The further data interface then delivers the second error result to the memory controller.

A further embodiment of the invention refers to a method of adjusting a time position of a data transfer of data from a memory controller to a memory circuit, wherein two identical first and second data are provided, wherein first data are at least partly masked. The second data are transferred to the memory circuit with a predetermined time position referred to a time basis At least a part of the non masked first data are used for performing an error detection calculation in the memory controller generating a first error result A second error result is received from the memory circuit calculated on the basis of the second data. The first and second error result are compared and, depending on a result of the comparison, the time position of the transfer of the second data is changed to receive a first and a second error result with a predetermined correlation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figures 1, 4:
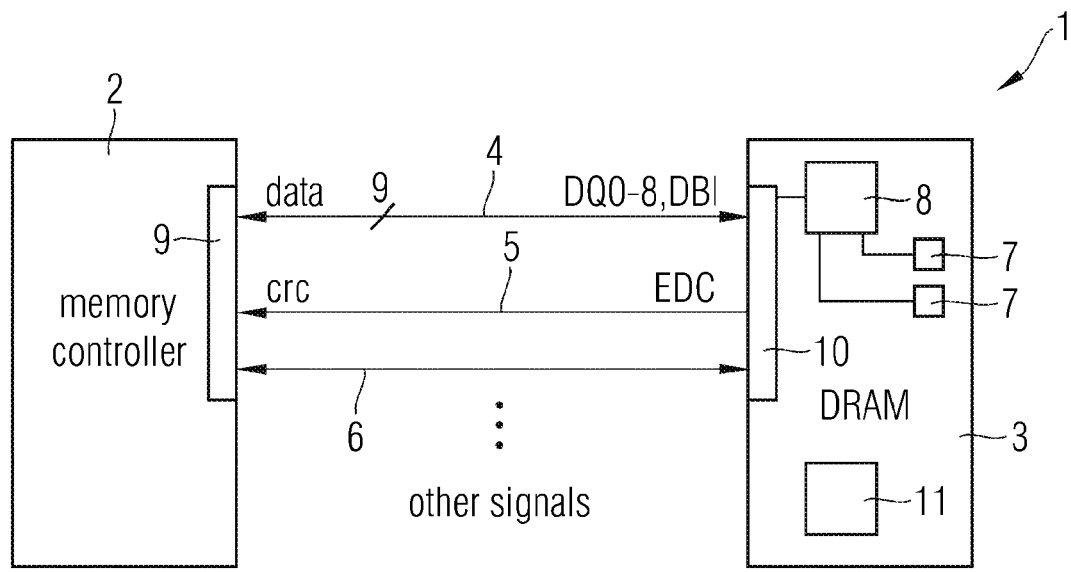
FIG. 1 depicts a memory system with a memory controller and a memory circuit.
FIG. 4 depicts an action table.

One or more implementations of the present invention will now be described with reference to the attached drawings, wherein like reference numerals are used to refer to like elements throughout, and wherein the illustrated structures are not necessarily drawn to scale.

The present invention may be described in terms of various functional components. It should be appreciated that such functional components may be realized by any number of hardware or structural components configured to perform the specified functions. For example, the present invention may employ various integrated components comprised of various electrically devices, such as resistors, transistors, capacitors, diodes and such components, the behavior of which may be suitably configured for various intended purposes. In addition, the present invention may be practiced in any integrated circuit application where an effective reversible polarity is desired. Such general applications may be appreciated by those skilled in the art in light of the present disclosure are not described in detail. Further, it should be noted that various components may be suitably coupled or connected to other components within exemplary circuits, and that such connections and couplings can be realized by direct connection between components and by connections through other components and devices located in between.

FIG. 1 depicts a memory system 1 with a memory controller 2 and a memory circuit 3. The memory controller 2 is connected by data lines 4 with the memory circuit 3. In the depicted embodiment, nine parallel data lines are disposed between the memory controller 2 and the memory circuit 3. Furthermore an error line 5 is disposed between the memory circuit 3 and the memory controller 2 providing error information to the memory controller 2. Furthermore, other signal lines 6 may be provided between the memory controller 2 and the memory circuit 3. Although referred to here as "data" lines 4 for purposes of convenience, the data lines 4 may be used for transmitting data, addresses of memory cells and control commands for controlling an operation of the memory circuit 3. The operation of the memory circuit 3 may be reading data from a memory element, writing data to a memory element and/or erasing data in a memory element of the memory circuit 3. The memory circuit 3 comprises memory elements 7 that may be arranged in arrays and be individually accessed by a reading and writing circuit 8. The reading/writing circuit 8 is connected with the memory elements 7. The memory controller 2 comprises an input/output circuit 9 and the memory circuit 3 comprises a second input/output circuit 10 for exchanging data and signals. The further input/output circuit 10 is connected with the reading/writing circuit 8. The memory circuit 3 may be constructed as a dynamic random access memory.

The memory circuit 3 comprises an error detection circuit 11 that checks the operation of the memory circuit 3 and sends a result data of the error detection by the error line 5 to the memory controller 2. The error detection circuit 11 may use cyclic redundancy checks (CRC) that are frequently carried out in order to detect errors, which can occur during the data transmission process. In this case, data signals are transmitted in blocks, and a redundant code is produced from the data in each block and is added to the block for error detection or correction. In one embodiment, a so-called CRC code (Cyclic Redundancy Check) is derived from the payload data in a block as a cyclic redundant code, using a predetermined algorithm. The CRC codes are produced by multiplication of a payload data signal sequence by a so-called generator polynomial. After reception of the codeword, it is divided by the generator polynomial. If the received codeword has been transmitted correctly, then the division process does not produce any reminder. Conversely, if the division process results in a reminder, this confirms the data transmission was not correct. Cyclic codes such as CRC codes are primarily of major interest because the multiplication and/or division of polynomials can be carried out relatively easily by means of so-called linear feedback shift registers. Multiplication by the generator polynomial thus makes it possible to generate code words, with the original information word being reproduced by the division of these code words, and a result being checked for errors at the same time.

One aspect of the present invention is to proceed with a write phase training without accessing the memory elements. The information returned by the error detection system from the memory circuit is used to align a time position of a data transfer from the memory controller to the memory circuit to a time basis of the memory circuit that is used for detecting the value of the data signal. The data that are received from the memory controller are sampled according to an internal time clock. Therefore it is necessary that the data are transmitted in a predetermined time phase related to the internal time clock of the memory circuit.

Usually, the error detection data returned by the memory circuit to the memory controller may contain enough information to allow phase relationship estimations between the data clock of the memory controller and the sampling clock of the memory circuit. So it is no longer necessary to do write operations to the memory elements of the memory circuit, but instead it is enough to monitor the information returned by the error detection circuit of the memory circuit when doing dummy writes. The dummy writes may be either performed by addressing closed banks, using a mask signal to mask all bits or by explicitly using dummy write commands, which would need to be implemented in the memory circuit.

In addition to not accessing the array of memory elements, this solution strongly reduces the time needed to do retraining. The state of the memory circuit is not changed during the entire operation and thus must not be restored. In the entire training only write operations are used, which avoids the lengthy write to read bus turn around times. The time gained by this solution can either be used for better tracking capabilities with higher retraining frequencies or for higher system memory bandwidth.

The error detection system in the memory circuit may work by calculating a CRC checksum over certain number of data lines and over all bits of one writing burst. The check sum is returned to the memory controller which can then decide whether the transmission of the data was error-free or not. In case of error the memory controller can decide to repeat transmission or even to redo the training. This works for read and write operations as well. In the write case, the memory circuit returns the check sum of the received data and the memory controller checks it against the self-calculated check sum of the previously transmitted data. In the read case, the memory circuit sends the data long with its check sum and the memory controller compares the check sum of the received data against the also received check sum.

The check sum may be calculated over nine data lines times 8 bits per burst, i.e., 72 bits of data for one data burst. The resulting 8 bits of the check sum are sent back on the error line to the memory controller 2 that are transmitted with one eight bit burst again.

In the present invention a masking circuit is used to mask at least a part of the data within the memory circuit and within the memory controller that are used for performing the CRC calculation of the check sum. This leads to a method that can be used to select at least one data bit or a predetermined number of data bits that are used for the error detection calculation. Depending on the embodiment, a single data line may be selected and the other data lines may be masked. Thus it is possible to select 8 data bits of a predetermined data line that are transferred by the data line from the memory controller to the memory circuit and other data of other data lines are not considered during the error code calculation.

Furthermore, in another embodiment, the masking circuit masks a data by replacing the value of the data by a predetermined value. For example in one embodiment, the masked data is replaced by a high value. This means that predetermined data and/or predetermined data lines may be given predetermined data values during the transfer of data. Thus it may be possible to put the data of 8 data lines on a high value during a data burst and to use only one data line for transmitting data according to a predetermined data pattern. The data pattern may be stored in the memory controller or may be generated by a data pattern generator that is part of the memory controller and/or the memory circuit.

Figure 2:
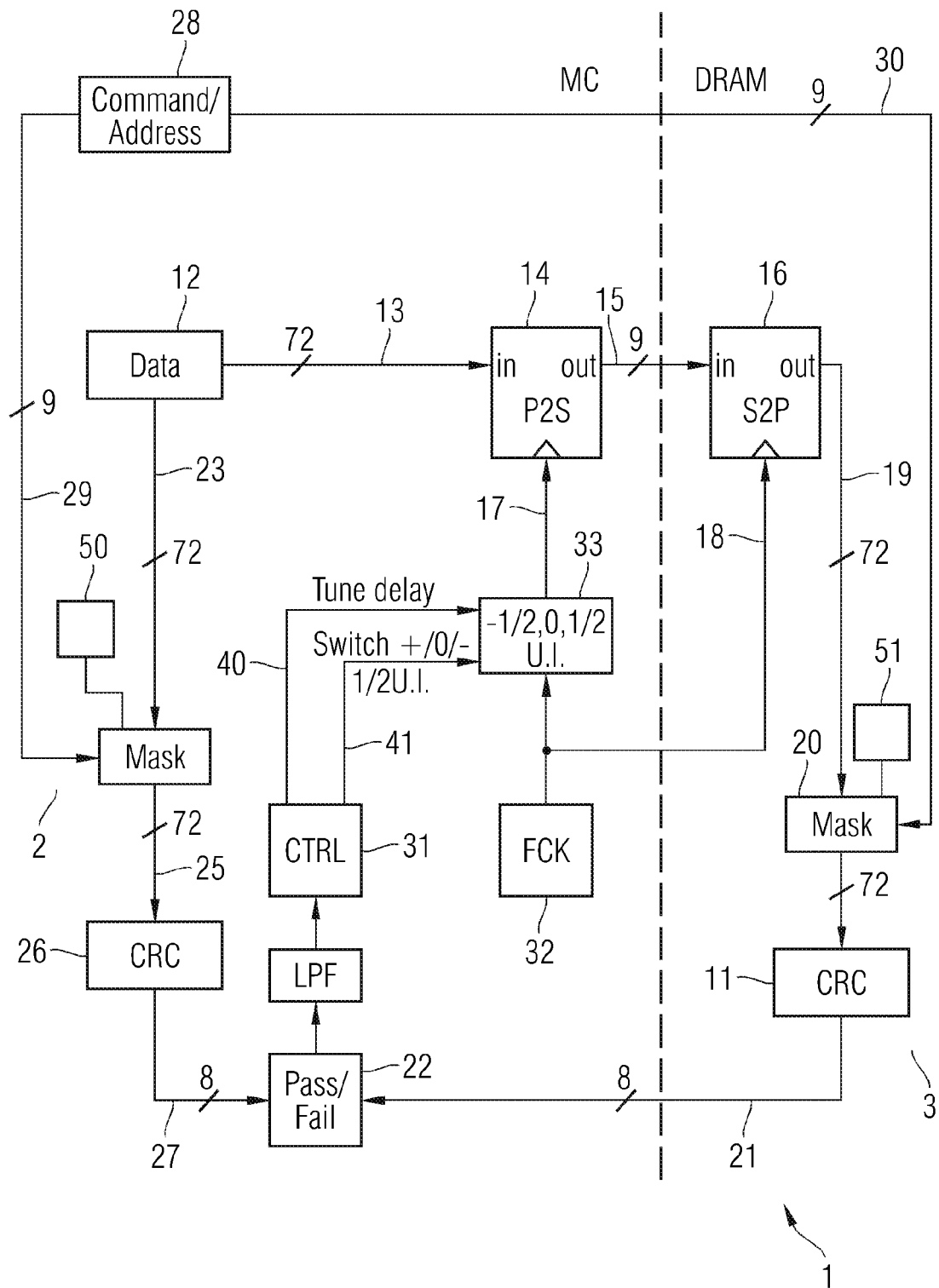
FIG. 2 depicts a detailed view of parts of the memory controller and parts of the memory circuit.

FIG. 2 depicts a schematic view of an embodiment of the invention with a memory system 1 comprising a memory controller 2 and a memory circuit 3. The memory circuit 3 may be realized as a dynamic random access memory, whereby in FIG. 2 only those parts of the memory circuit 3 are depicted that are of interest for the understanding of the invention. For the memory controller 2 only those parts of the memory controller 2 are depicted that are of interest for the understanding of the invention. Other parts are not depicted and not explained in further detail.

The memory controller 2 comprises a providing circuit 12 that is connected by 72 first data lines with a parallel-to-serial (P2S) transforming circuit 14. The parallel-to-serial transformer 14 receives 72 data bits in parallel, stores the 72 data bits and transfers the 72 data bits as second data by nine second data lines in parallel with a data burst of 8 data bits over a second data line 15 to a serial-to-parallel (S2P) transforming unit 16 of the memory circuit 3. The P2S transformer 14 constitutes a first data interface. The P2S transformer 14 is clocked by a data clock with a clocking signal 17. At each clock of the clocking signal 17, nine data bits are transferred in parallel from the P2S transformer 14 over the nine second data lines 15, whereby eight data bits are transferred as a data burst in series for one data line.

In the S2P transformer 16 the incoming second data are buffered and sampled at a rising edge of a second clock signal 18 that is delivered to the S2P transformer 16. The S2P transformer constitutes a further second data interface. The sampled data of a data burst means that 72 data bits are transmitted by the S2P transformer 16 over 72 third data lines 19 in parallel to a further masking circuit 20. The third data lines 19 constitute a further third data interface.

The further masking circuit 20 masks at least one data bit of the receiving second data of a data burst and delivers at least one non-masked data bit to a further error detection circuit 11 over a further fourth data interface. The further error detection circuit 11 may calculate error detection information using at least one non-masked data bit of the second data. The error detection information is transferred as a second error result by 8 fourth data lines 21 to a comparing unit 22 of the memory controller 2. The fourth data lines 21 constitute a second data interface on the side of the memory controller and a further second data interface on the side of the memory circuit.

The providing circuit 12 delivers to a masking circuit 24 first data with the same 72 data values as the second data of the data burst that is transmitted by the P2S transformer 14 to the memory circuit 3 by fifth data lines 23 as a third data interface to the masking circuit 24. 72 fifth data lines 23 are disposed for transmitting the data from the providing circuit 12 to the masking circuit 24. The masking circuit 24 masks at least one of the first data that are received by the fifth data lines 23 and delivers at least one non-masked data by 72 sixth data lines 25 as a fourth data interface to an error detection circuit 26. The error detection circuit 26 calculates an error result using the received at least one non-masked first data. The error result is delivered by 8 seventh data lines 27 to the comparing circuit 22.

The masking circuit 24 and the further masking circuit 20 may use the same masking method for masking at least one data bit. The masking method may be stored in the memory controller 2 for the masking circuit 24 and in the memory circuit 3 for the further masking circuit 20. In a further embodiment, as depicted in FIG. 2, the masking circuit 24 and the further masking circuit 20 are in connection with a command circuit 28 that delivers the same masking command to the masking circuit 24 and to the further masking circuit 20 for at least the same first and second data. The command circuit 28 is connected with 9 eighth data lines 29 with the masking circuit 24 and with 9 ninth data lines 30 with the further masking circuit 20.

The masking command determines, which of the first data that are received by the masking circuit 24 and which of the second data that are received by the further masking circuit 20 are masked and which are not. The first and the second data are identical and provided by the providing circuit 12.

In a further embodiment, the masking command may determine the parts of the first data that are masked by the masking circuit 24 and the parts of the second data that are masked by the further masking circuit 20 by replacing a value of a masked data bit with a predetermined data value. For example, the masking circuit 24 and the further masking circuit 20 may replace the data bit that are to be masked with a predetermined high value, i.e., a logical "1". In a further embodiment, the masked first and second data may be replaced by the masking circuit 24 and the further masking circuit 20 by a low value, i.e., a logical "0".

The comparing circuit 22 compares the first and second error result that are received from the error detecting circuit 26 and from the further error detecting circuit 11. If the received error results are in a predetermined correlation to one another, then the comparing circuit 22 delivers a pass signal to a control circuit 31. In one embodiment the correlation may be that the first and second error result are equal. If the result data of the error detection circuit 26 and the further error detection circuit 11 are not in a predetermined correlation to each other, then the comparing unit 22 delivers a fail signal to the control circuit 33.

In the shown embodiment, there is a clock generator 32 that delivers a second clock signal 18 to the S2P transformer 16 and to a time controlling unit 33. The clock generator may be arranged in the memory controller or in the memory circuit. The time controlling unit 33 receives two inputs from the control circuit 31. A first input signal 40 controls a time delay of the clocking signal 17 that is derived from the second clock signal 18 by means of the time controlling unit 33 in small time intervals; for example, in 1/64 of a unit interval. The second input signal 41 controls a time shift of the clocking signal 17 with ½ of a unit interval forward or back relative to the second clock signal 18. The time controlling unit 33 can be used to shift the clocking signal 17 relative to the second clock signal 18. The second clock signal 18 provides a time basis that may be used by the memory circuit. The clocking signal 17 provides a second time basis that is used for transferring the second data by the first data interface to the memory circuit. The second data are sent as a data signal with an alternating level that may have a phase shift compared to the second clock signal 18. The phase shift between the data signal and the second clocking signal 18 is controlled by shifting the clocking signal 17. The clocking signal 17 determines the time position (timing) of the second data transfer and therefore the phase shift between the data signal of the transferred second data and the second clock signal 18.

The time controlling unit 33 delivers the clocking signal 17 to the P2S transformer 14. The clocking signal 17 may be an alternating rectangle frequency signal that controls with a position of a rising edge the time position with which the second data are transferred to the memory circuit. The clock generator 32 may deliver the second clock signal 18 to the S2P transformer 16 of the memory circuit 3. The second clock signal 18 may be an alternating rectangle frequency signal whereby the rising edges of the second clock signal determines the time points at which the received and buffered data are sampled in the S2P transformer 18.

In one embodiment the masking and the error detection calculations (i.e. a CRC checksum calculation) in the memory controller 2 and the memory circuit 3 may be identical. That means that if the second data are correctly transferred from the memory controller 2 to the memory circuit 3 with the correct phase referring to the second clock signal 18 of the memory circuit 3, then the further error detection circuit 11 and the error detection circuit 26 may deliver the same error result (CRC checksum) to the comparing circuit 22. This means that the comparing circuit 22 only has to detect whether the error results of the error detection circuit 26 and the error result of the further error detection circuit 11 are equal. If this is the case, then the comparing circuit 22 delivers a pass signal to the control circuit 31. If the two received error results are not equal, then the comparing circuit 22 detects a failure for the transfer of the second data from the memory controller 2 to the memory circuit 3 and delivers therefore a fail signal to the control circuit 31.

In a further embodiment, only one data interface is disposed at the memory controller and at the memory circuit for exchanging data and error results or command signals.

In a further embodiment, the comparing circuit may be constituted as an analyzing circuit that analyzes the first and/or the second error result. In one embodiment, the analyzing circuit may perform an inverse calculation of the error detection calculation used in the memory circuit to generate the non masked data that were used for calculating the second error result. In this embodiment, the analyzing circuit is directly connected with the providing circuit and compares the data that were transferred to the memory circuit with the recalculated data.

In a further embodiment, the masking circuit 24 may be connected with a first data register 50 and the further masking circuit 20 may be connected with a second data register 51. In the first and second data register 50,51 mask patterns are stored that are used for masking the data in the masking circuit 24 and the masking circuit 20. The masking data pattern may also be supplied by the command circuit 28 to the masking and further masking circuit 24,20 and changed during the operation of the memory controller and the memory circuit. The command circuit may determine which of the data of a data burst are masked and which not. This information may be given by the position of the data bits within the burst that have to masked. For example: the first three data bits and the last data bit of the data burst have to be masked. This information is used by the masking circuit and further masking circuit determining which of the data bits are masked.

In one embodiment, the masking circuit and the further masking circuit deliver the masked data and the non masked data to the error detection circuit and the further error detection. The values of the masked data may be determined with predetermined values.

In a further embodiment, it is possible to change the phase of the second clock signal 18 to adjust the time position of the transfer of the data relative to the time basis i.e. the second clock signal 18.

Figure 3A:
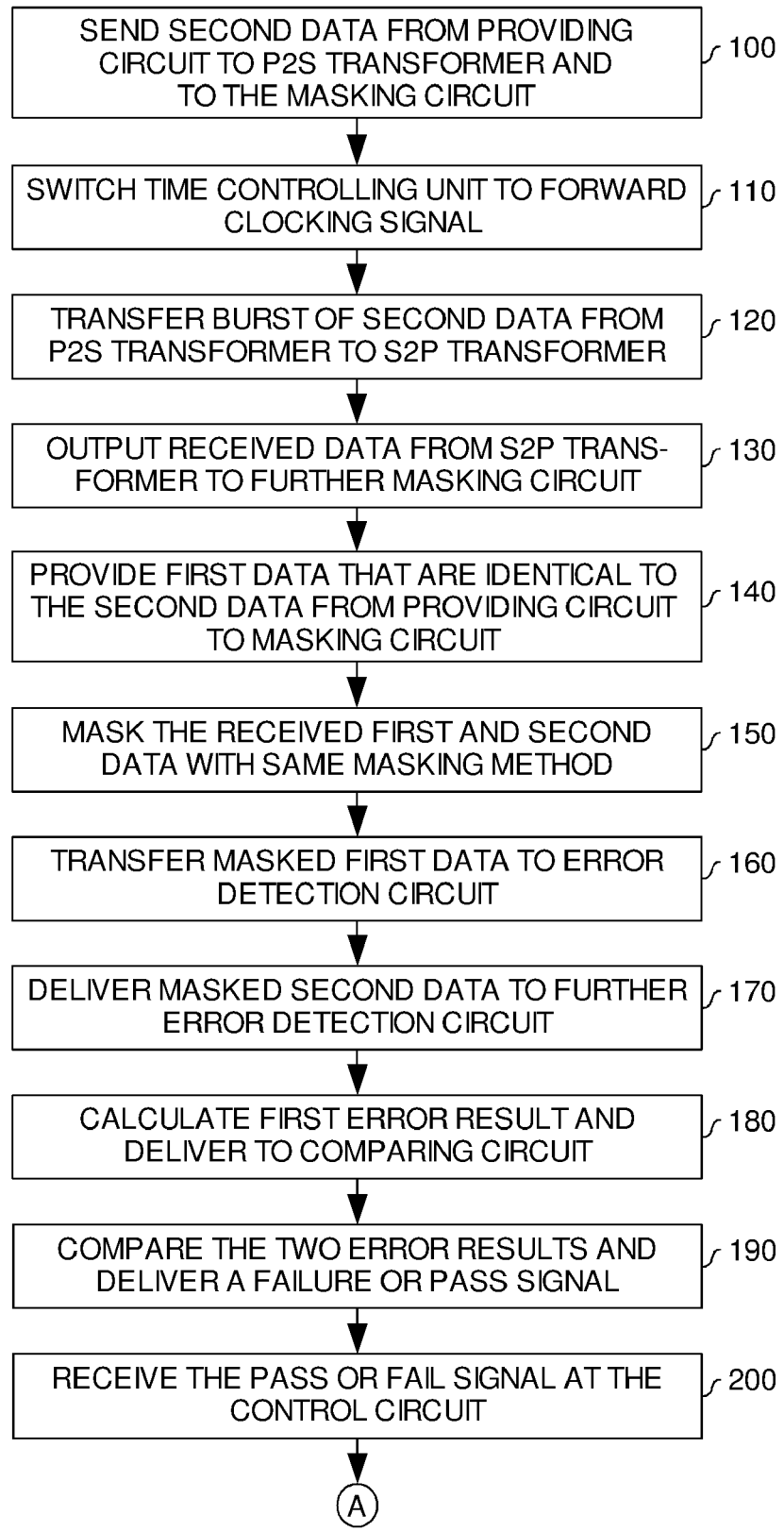
FIG. 3A and 3B (collectively referred to herein as FIG. 3) depict a program flow of adjusting a phase of the memory controller to a phase of an internal clock of the memory circuit.
Figure 3B:
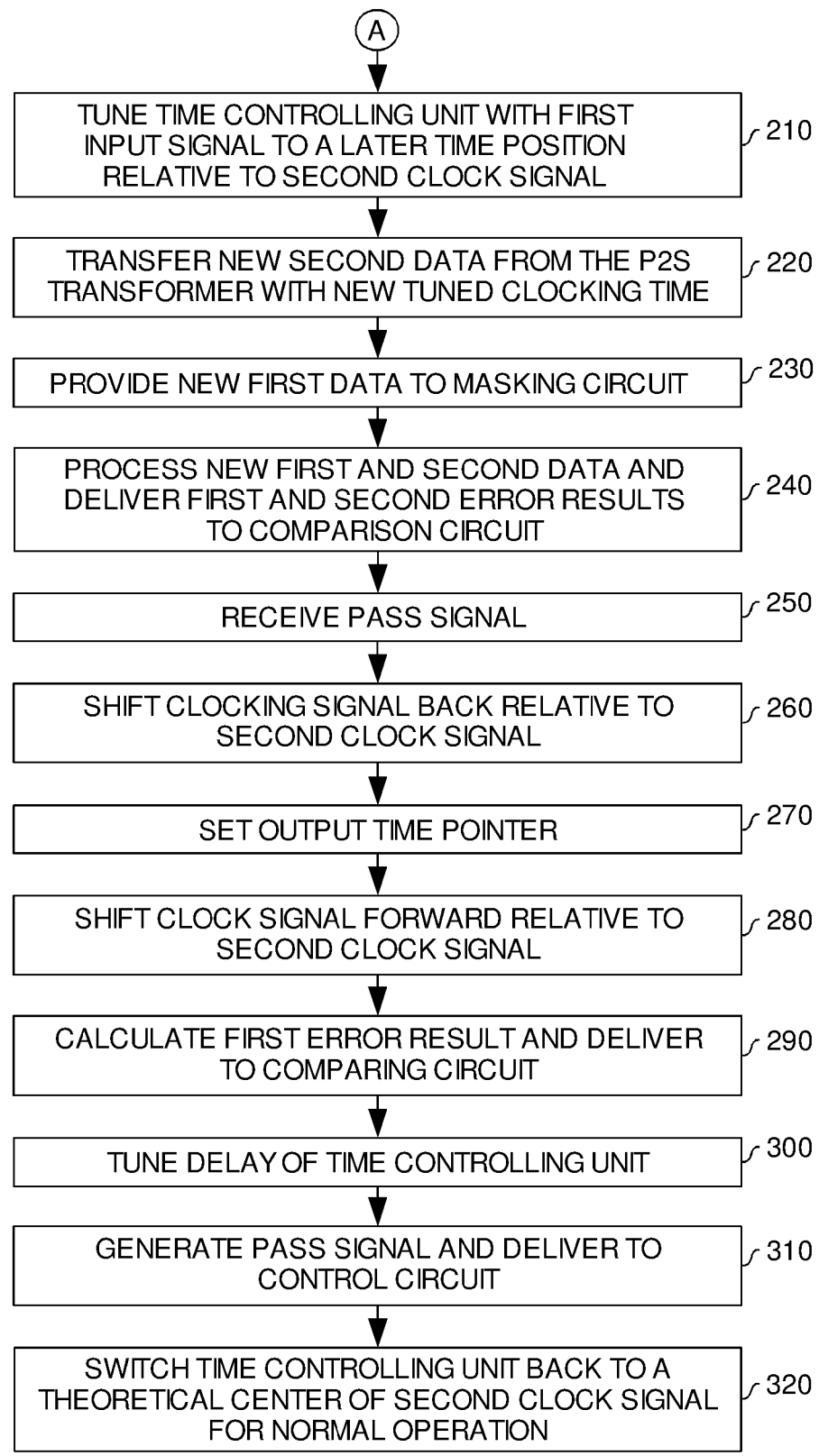

FIG. 3 depicts a process flow for synchronizing the time basis of the transfer of the second data from the P2S transformer 14 to the S2P transformer 16. At a first program step 100 second data are sent from the providing circuit 12 to the P2S transformer 14 and to the masking circuit 24. The second data are stored in the P2S transformer 14 and transferred with rising edges of the clock signal 17 to the S2P transformer 16 of the memory circuit 3. The time controlling unit 33 is at this state in a theoretical centre phase that is optimum for the transfer of the second data.

In a further program step 110 the control circuit 31 switches the time controlling unit 33 with the second input signal ½ unit interval forward compared to the second clock signal 18. This means that the clocking signal 17 is ½ unit interval forwarded relative to the second clocking signal 18. At a following program step 120 a burst of second data with 72 data bits is transferred from the P2S transformer 14 with rising edges of the clocking signal 17. The S2P transformer 16 receives and detects the received data with rising edges of the second clocking signal 18 and outputs the detected data to the further masking circuit 20 at a program step 130.

First data that are identical to the second data were delivered from the providing circuit 12 to the masking circuit 24 at a following program step 140. The masking circuit 24 and the further masking circuit 20 mask the received first and second data with the same masking method at a program step 150. The masking method may be determined by the command circuit 28 using a masking command that is delivered from the command circuit 28 to the masking circuit 24 and to the further masking circuit 20.

The masked first data are transferred from the masking circuit 24 to the error detection circuit 26 at a program step 160. Additionally, the masked second data of the further masking circuit 20 are delivered to the further error detection circuit 11 at a program step 170. The further error detection circuit 11 calculates using at least the non-masked second data a second error result that is delivered to the comparing circuit 22. At the same time the error detection circuit 26 calculates a first error result using at least the non-masked first data from the masking circuit 24 and delivers the calculated error result to the comparing circuit 22 at a program step 180.

The comparing circuit 22 compares the two error results and delivers a failure or pass signal to the control circuit 31 depending on the comparison of the two error results at program step 190. If the two error results are equal then a pass signal is delivered. If the two error results are different, then a fail signal is delivered.

The control circuit 31 receives the pass or fail signal at a program step 200. If a fail signal is received, then the control circuit 31 tunes the time controlling unit 33 with the first input signal 40 a time unit, i.e. 1/64 of a unit interval to a later time position relative to the second clock signal 18 at program step 210.

At the following program step 220 again new second data are provided and transferred by the P2S transformer 14 with the new tuned clocking time. At the same time the providing circuit provides the new first data to the masking circuit 24 at a program step 230. The new first and second data are identical. The new first and second data are processed as explained above in the memory controller and in the memory circuit and a first and second error result are delivered to the comparison circuit 22 at a program step 240. The comparison circuit 22 delivers a pass or fail circuit to the control circuit 31. The control circuit 31 continues to iteratively tune the time controlling unit 33 by a time unit to a later time, and new first and second data are transferred, and error results calculated in the memory circuit and the memory controller, until the comparison circuit delivers a pass signal to the control circuit 31.

After receiving a pass signal at program step 250, then the control circuit 31 shifts at a following program step 260 the clocking signal 17 ½ unit interval back relative to the second clock signal 18 by means of the second input signal controlling the time controlling unit 33.

Then the providing circuit 12 delivers 8 unique values as a burst group, whereby two bits of the burst have a time distance that is equal to a unit interval. The eight bits may be for example a deBruijn code. The eight bits may comprise one high value and seven low values. At a first burst the high value bit is at the first bit position of the burst. At the second burst the high value is at the second bit position of the data burst. At the third data burst, the high value bit is at the position of the third bit of the data burst and so on. At the eighth data burst, the high value is at the last bit position of the data burst. Each data burst is delivered in parallel to the masking circuit 24 as explained above. Additionally for each burst the masking and the further masking circuit 24, 20 calculate a first and second error result. For each data burst the comparison circuit 22 sends a fail or a pass signal to the control circuit 31. The control circuit 31 detects the number of the burst and therefore the bit position of the high value bit for which a pass signal is received. The control circuit 31 sets an output time pointer for this position of the high value bit representing a time point for transferring a correct data burst. The output time pointer determines the position of the high value bit in the burst for which a pass signal was received and at which time point a burst of data should be started to be transferred from the P2S transformer 14 to the memory circuit 3.

After this program step 270, then the control circuit 31 shifts the clock signal 17 ½ unit interval forward relative to the second clocking signal 18 by means of the second input signal 41 at a program step 280. Then one or more random data patterns are provided in data bursts by the providing circuit 12 to the S2P transformer 14 and to the masking circuit 24.

The random data patterns are provided by the providing circuit 12 to the P2S transformer 14 and transferred to the S2P transformer 16 of the memory circuit. The random data are sent in data burst however at least one transition of a high and a low data value may be performed during the data burst. The same random data pattern is delivered from the providing circuit 12 to the masking circuit 24. Additionally the received random data pattern is stored and sampled in the P2S transformer 16 on the time basis of the second clock signal 18. The sampled random data are delivered to the further masking circuit 20. The further masking circuit 20 masks the delivered random data pattern according to a determined masking method and transfers the masked data to the further error detection circuit 11. The further error detection circuit 11 calculates a second error result and delivers the second error result to the comparing circuit 22.

During the same time, the masking circuit 24 masks the delivered random data pattern according to the determined masking method and delivers the masked random data to the error detection circuit 26. The error detection circuit 26 calculates a first error result and delivers the first error result to the comparing circuit 22 at a program step 290.

The comparing circuit 22 generates a pass signal if the two received error results are identical and delivers the pass signal to the control circuit 31. The comparing circuit 22 generates a fail signal and delivers the fail signal to the control circuit 31 if the error results are different.

The control circuit 31 observes the pass or fail signal and tunes the delay of the time controlling unit 33 at a program step 300 according to the phase detection table as shown in FIG. 4. The phase detection table comprises three columns that refer firstly to a time position of the clocking signal 17 versus the second clock signal 18, secondly the value of the comparison of the comparison circuit 22 and thirdly the action that is derived from the situation.

In the relative timing situation where the data clock (i.e., the clocking signal 17) is in a forward position relative to the second clocking signal 18, the data are said to "early". If there is a pass signal while in this relative timing situation, then the control circuit 31 does not change the time delay. However, if the control circuit 31 receives a fail signal while in this relative timing, then the control circuit 31 tunes the time controlling unit 33 by means of the first signal input step by step with a time unit to a later time position relative to the second clocking signal 18. After each change of the time position of the clocking signal 17 a burst of data is transferred to the memory and the burst of data is processed in the memory circuit and in the memory controller as explained above and two error results are calculated and delivered to the comparing unit 22. This process is repeated until a pass signal is generated by the comparing circuit 22 and delivered to the control circuit 31 at a program step 310.

After the program step 310 the control circuit 33 switches the time controlling unit 33 back ½ of a unit interval to a theoretical centre of the second clock signal 18 for a normal operation at the program step 320. Now the time position is in an improved position and the time controlling unit 33 is locked. The further data are transferred from the memory controller to the memory circuit without changing the time position of the clocking signal 17.

In a further embodiment, each time the second data are sent from the memory controller to the memory circuit 3, a masking information may be sent from the command circuit 28 to the further masking circuit 20 of the memory circuit 30. The same masking information is delivered from the command circuit 28 to the masking circuit 24.

If the second data are delayed compared to the second clock signal 18, the data are said to be "late". In this situation the control circuit 31 only moves the time position of the second data to an earlier time relative to the second clock signal 18 if a pass signal is received from the comparing circuit 22.

If the data are in a centered position, then the control circuit 31 does not change the tuning of the time controlling unit 33 regardless of whether the signal from the comparing circuit 22 is a fail signal or a pass signal.

In the situation that the second data are in an early position compared to the second clock signal 18, then the control circuit 31 moves the second data to a later time position compared to the second clock signal 18 if a fail signal is received from the comparing circuit 22.

One principle of these controlling strategies is that if the clock latching or buffering the data at the memory circuit is moved a half of a unit interval (i.e., half of the time difference between two data bits) in the forward direction from the assumed middle point, and if the second data is being sampled correctly (meaning that a pass signal is delivered from the comparing circuit 22 to the control circuit 31), then the clocking signal must have already been in an earlier time position. This means that the data is relatively late and should be moved to an earlier time position. The converse is true if the signal of the comparing circuit is a fail signal.

In this fashion, the comparison of the error detecting circuits acts as a phase detector producing a binary value representing early or late phase information. This information is ultimately used to adjust the time in a closed loop fashion until an equivalent number of early/late data becomes the stable point, at which time the system is locked. Once the system is locked, the latching clock can be moved back to the centre position for improved data latching.

While the foregoing is directed to embodiments of the present invention, other and further embodiments of the invention may be devised without departing from the basic scope thereof, and the scope thereof is determined by the claims that follow.

What is claimed is:

1. A memory controller, comprising:
   a first data interface for at least sending data to a memory circuit;
   a masking circuit;
   a data providing circuit that is connected with the first data interface and the masking circuit; wherein the data providing circuit is configured to deliver same data to the first data interface and to the masking circuit; wherein the first data interface outputs the data received from the data providing circuit with a predetermined time position relative to a reference time;
   an error detection circuit connected with the masking circuit; wherein the masking circuit masks parts of the data and delivers at least a non masked part of the data to the error detection circuit; wherein the error detection circuit calculates a first error result using the received non masked data;
   an analyzing comparing circuit connected with the error detection circuit and configured to receive the first error result; wherein the analyzing circuit is configured to receive a second error result of the memory circuit; wherein the analyzing circuit analyzes the first and second error result to produce correlation information; and
   a controlling circuit configured to receive the correlation information; the controlling circuit being configured to control the time position of the output of the data by the first data interface relative to the reference time on the basis of the correlation information.

2. The memory controller of claim 1, further comprising a second data interface for receiving data from the memory circuit.

3. The memory controller of claim 2, wherein the analyzing circuit is connected with the second interface and receives the second error result of the memory circuit from the second interface.

4. The memory controller of claim 1, wherein the masking circuit selects one data bit and masks other data bits, the one data bit being the non masked part of the data provided to the error detection circuit.

5. The memory controller of claim 1, wherein the providing circuit is connected with a predetermined number of data channels in parallel with the masking circuit, wherein the masking circuit is connected with a predetermined number of data channels with the error detection circuit, wherein the masking circuit selects at least one data channel and masks the other data channels.

6. The memory controller of claim 1, wherein the masking circuit masks data by replacing a value of a masked bit of the data with a predetermined value and delivers the predetermined value of the masked data and the non masked data to the error detection circuit.

7. The memory controller of claim 1, wherein the masking circuit is connected with a command circuit; the masking circuit receives a control command that specifies a masking method that is used by the masking circuit.

8. The memory controller of claim 7, wherein the masking circuit is connected by data channels with the error detection circuit, wherein according to the specified masking method the masking circuit masks only one of the data channels.

9. The memory controller of claim 7, wherein according to the specified masking method only one predetermined data bit of the data is not masked.

10. The memory controller of claim 1, wherein the controller circuit adjusts the time position of the data output by the first data interface relative to the reference time to a time position at which the correlation information of the analyzing circuit indicates a predetermined correlation between the first and second error result.

11. The memory controller of claim 1, wherein the correlation information is a pass indication indicating that the first and second error result are equal or a failure indication indicating that the first and second error result are different.

12. The memory controller of claim 1, wherein the error detection circuit is a cyclic redundancy calculation circuit.

13. The memory controller of claim 1, wherein the memory controller sends a masking control command to the memory circuit specifying a method to mask data before performing an error detection calculation generating the second error result in the memory circuit.

14. The memory controller of claim 13, wherein the control command determines with a data pattern which of the received data are to be masked.

15. The memory controller of claim 1, wherein the masking circuit is connected with a mode register that determines which of the received data are to be masked.

16. A memory system, comprising:
   a memory controller and a memory circuit coupled to each other;
   wherein the memory controller comprises:

a first data interface for at least sending data to a memory circuit;

a first masking circuit;

a data providing circuit that is connected with the first data interface and the first masking circuit; wherein the data providing circuit is configured to deliver same data to the first data interface and to the first masking circuit; wherein the first data interface outputs the data received from the data providing circuit with a predetermined time position relative to a reference time;

a first error detection circuit connected with the first masking circuit;

wherein the first masking circuit masks parts of the data and delivers at least a non masked part of the data to the first error detection circuit; wherein the first error detection circuit calculates a first error result using the received non masked data; and an analyzing circuit connected with the first error detection circuit and configured to receive the first error result; wherein the analyzing circuit is configured to receive a second error result from the memory circuit; wherein the analyzing circuit analyzes the first and second error result to produce correlation information; and a controlling circuit configured to receive the correlation information; the controlling circuit being configured to control the time position of the output of the data by the first data interface relative to the reference time on the basis of the correlation information; and wherein the memory circuit comprises:

memory elements for storing data;

a second data interface for at least receiving data from the memory controller, buffering the data, sampling the buffered data according to a reference time and outputting the sampled data;

a second masking circuit connected with the second data interface to receive the output data, and configured to mask a part of the data and output at least a part of the non masked data; and a second error detection circuit connected with the second masking circuit to receive the non-masked data and output the second error result which is returned to the analyzing circuit.

17. The memory system of claim 16, wherein the memory controller further comprises a command circuit coupled to the first and masking circuits via a command line; the command circuit determining a method of masking performed by the first and second masking circuits.

* * * * *